United States Patent
Tice

[15] 3,659,710
[45] May 2, 1972

[54] ARTICLE EXTRACTING DEVICE

[72] Inventor: Joseph Tice, 210 Yorkshire Drive, Greenville, S.C. 29307

[22] Filed: Aug. 6, 1970

[21] Appl. No.: 61,609

[52] U.S. Cl. .................................. 209/125, 198/31, 209/74
[51] Int. Cl. ........................................................ B07c 7/00
[58] Field of Search ................... 209/74, 122, 125, 123, 90; 198/229, 31, 230

[56] References Cited

UNITED STATES PATENTS 3,480,140  11/1969  Unkefer ............................. 209/74 X
3,455,443  7/1969  Wilder ................................. 209/74
3,416,640  12/1968  Svobida ................................ 198/31

Primary Examiner—Allen N. Knowles
Assistant Examiner—Gene A. Church
Attorney—Bailey and Dority

[57] ABSTRACT

An apparatus for extracting defective articles from a row of articles moving on a conveyor. The apparatus includes a vibrating plate which transfers the articles from the conveyor to a trap door. When the trap door is open the articles are allowed to drop therethrough. When the trap door is closed the articles move thereover to a receiving station. Divider plates are provided for maintaining the articles in rows.

2 Claims, 5 Drawing Figures

PATENTED MAY 2 1972
SHEET 1 OF 2
3,659,710
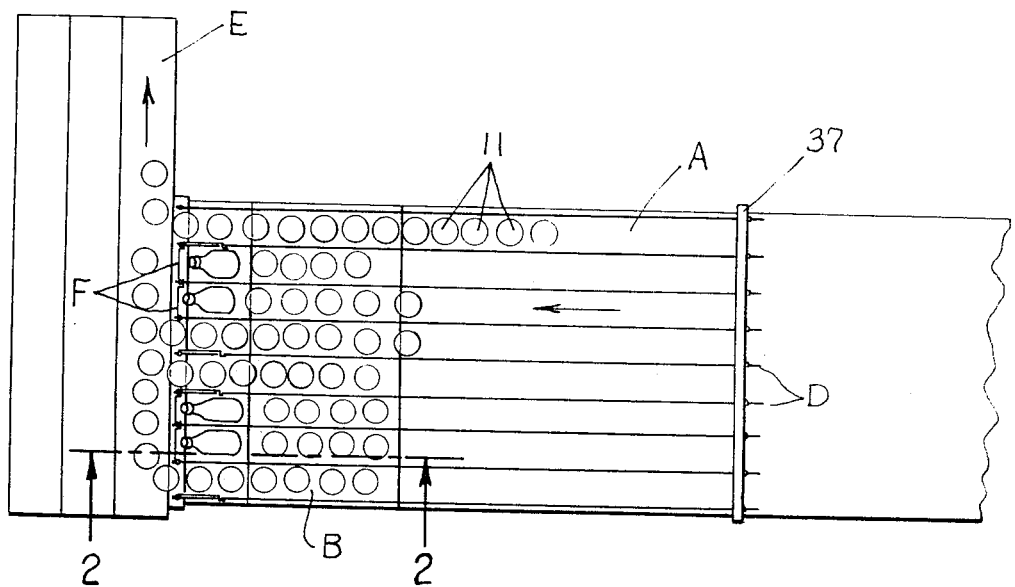
Fig. 1.
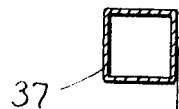
Fig. 2.
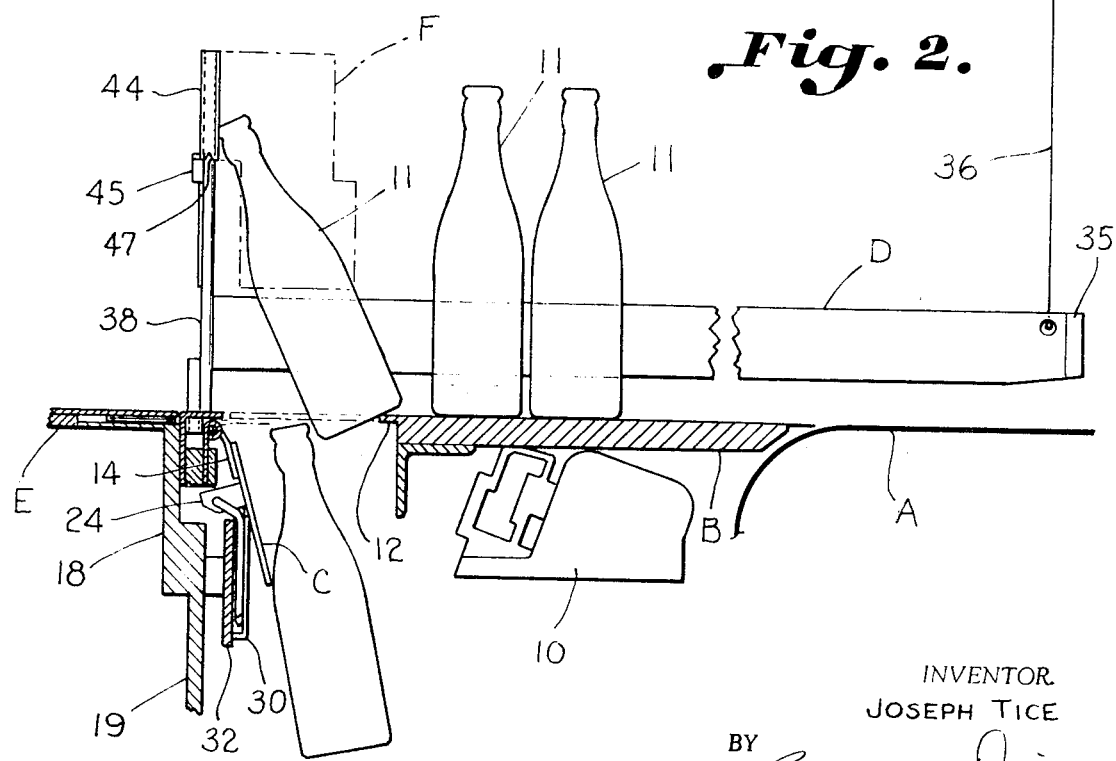
INVENTOR.
JOSEPH TICE
BY Bailey + Dority
ATTORNEYS.

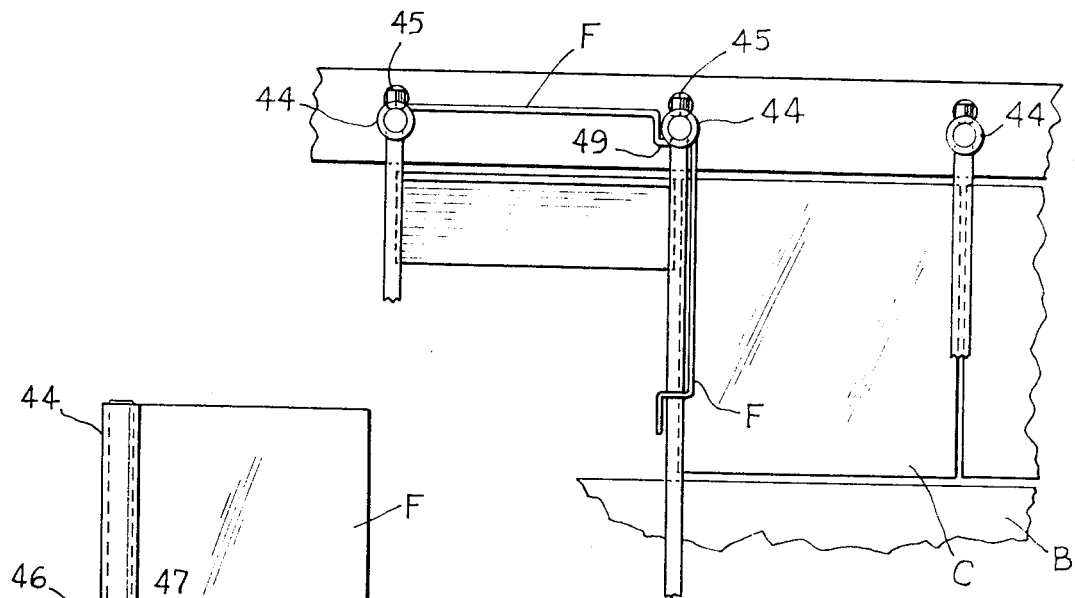
Fig. 3.
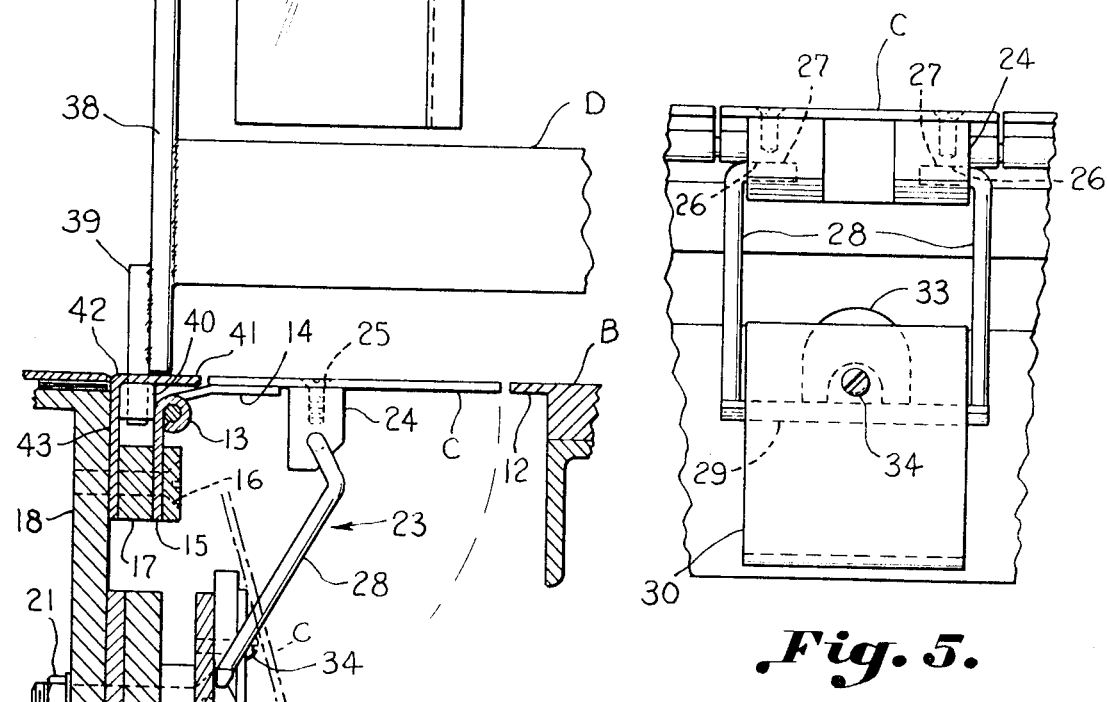
Fig. 4.
Fig. 5.
INVENTOR.
JOSEPH TICE
BY
Bailey + Dority
ATTORNEYS.

ARTICLE EXTRACTING DEVICE

This invention relates to an apparatus for extracting defective articles from a plurality of articles, and more particularly to an apparatus for stripping articles from a row of articles.

In the glass industry and particularly in making bottles there is a problem of stripping defective bottles coming from the molds. Normally, after the bottles come from the molds they are placed in rows on a tempering oven conveyor which is generally referred to as a lehr. Therefore, all of the bottles coming from a particular mold are placed in a single row. In starting up the glass making operation a very critical temperature must be maintained in the molds in order to produce an acceptable bottle. Often before the first acceptable bottle comes out of the mold the mold will run sometimes for hours, producing defective bottles. Defective bottles may also be caused by flaws in the mold or foreign matter collecting therein. The glass from defective bottles is reground and used over.

Heretofore, when it was desired to strip a row of bottles from the conveyor it had to be stopped and the operator walked along the conveyor between the rows of bottles, manually picking up the defective bottles. Not only is such an operation time consuming, but sometimes the bottles in other rows were tipped over during the stripping process.

Accordingly, it is an important object of the present invention to provide an apparatus for automatically extracting articles from a row of articles moving on a conveyor means.

Another important object of the present invention is to provide an apparatus which includes a vibratory transfer plate and a trap door in which defective bottles can be transferred from the conveyor through the trap door to a receptacle.

Another important object of the present invention is to provide a simple and relatively fool-proof apparatus for mechanically stripping defective articles from a plurality of articles.

The construction designed to carry out the invention will be hereinafter described, together with other features thereof.

The invention will be more readily understood from a reading of the following specification, and by reference to the accompanying drawings forming a part thereof, wherein an example of the invention is shown and wherein:

FIG. 1 is a plan view illustrating bottles being moved along a tempering oven conveyor over trap doors onto a receiving conveyor, FIG. 2 is a longitudinal sectional elevation taken along line 2—2 of FIG. 1, showing the bottles being dropped through the trap door, FIG. 3 is an enlarged fragmentary plan view illustrating one striker gate in the closed position and the other in the open position, FIG. 4 is an enlarged elevational view illustrating the striker gate, the trap door, and a portion of the vibrating plate, and FIG. 5 is an enlarged elevational view illustrating a magnetic latching member for the trap door.

The drawings illustrate an apparatus for extracting articles from a row of articles moving on the conveyor A. A vibrating plate B is carried at the end of the conveyor for receiving articles from the conveyor. A plurality of trap doors C are carried on an opposite side of the vibrating plate from the conveyor A. Divider plates D are carried over the conveyor A for maintaining articles in a row.

A receiving station E is located on the opposite side of the trap doors C from the conveyor A. Gates F are carried between the trap doors C and the receiving station E. Means are provided for closing the striker gate F for preventing the articles from being transferred to the receiving station E. Means is provided for opening the trap door C for allowing the articles moving across the vibrating plate B to drop through the door C for removing defective articles from the row of articles. Thus, when the trap door C is closed, the articles are pushed over the trap door to the receiving station E by succeeding articles on the conveyor.

In making articles, such as glass bottles, generally they are formed in heated molds and conveyed from the molds onto a tempering oven conveyor, such as illustrated by the conveyor A. The bottles generally exit from the molds (not shown) in single file, and are aligned up adjacent the end of the conveyor A. A pusher is then used to push the bottles onto the conveyor A in parallel form. All of the bottles coming out of a particular mold are fed onto the conveyor A in the same row. Therefore, if there is a devective mold, then all of the defective bottles coming thereout will be in the same row of bottles on the conveyor A. As previously mentioned, the defective bottles may be caused by the improper temperature of the mold and sometimes it takes several hours to get the molds at the proper operating condition. Therefore, it can be seen that it is a considerable problem in stripping defective bottles from the conveyor A.

The conveyor A may be any suitable conventional conveyor, and in one particular embodiment, is adapted to move eight rows of bottles simultaneously. It is to be understood, of course, that it could be enlarged to handle any desired number of bottles.

The bottles are moved off the conveyor A in the direction of the arrow illustrated in FIG. 1 over a transfer plate or vibrating plate B.

The vibrating plate B is carried adjacent the end of the conveyor A and extends across the entire width of the conveyor A. The vibrations are imparted to the vibrating plate by a vibrating motor 10, which may be any conventional vibratory device. The vibrations are sufficient to walk the bottles 11 from the end of the conveyor to the trap door C. Normally, as a result of the vibration the bottles are walked across the vibrating plate B at a higher speed than they are being fed thereon from the conveyor A. This, in turn, causes the bottles to separate allowing them to drop freely through the trap door C.

When it is desired to strip certain of the bottles 11 from a row or strip the entire row of bottles, the trap door C is merely depressed opening such to the position illustrated in FIG. 2, allowing the bottles to drop therethrough. The bottles tilt and engage the striker gate F as it reaches the trailing edge 12 of the vibrating plate B. The bottom of the bottles 11 are vibrated off of the edge 12 and are allowed to drop substantially vertically through the trap door.

If the striker gate F were not utilized, it is possible that the bottles would fall across the trap door. This problem, of course, could be solved by enlarging the size of the trap door C, but such increases the noise created by the bottles falling through the trap door into the receptacle.

Means including a hinge 13 is provided for opening the trap door. One flange 14 of the hinge is attached to the bottom side of the trap door by any suitable means, such as welding. The other flange 15 is attached by means of a bolt 16 extending through a positioning block 17 to a brace 18 which is, in turn, suitably carried on a vertical standard 19. The brace 18 is attached to the vertical standard 19 by the bolt 20 and nut 21.

Means 23 is provided for maintaining the trap door closed when it is desired that the articles be allowed to move thereover to the receiving conveyor E. The means 23 includes a block 24 which is attached to the bottom side of the trap door by screws 25. The block 24 has opposed holes 26 carried in the side wall thereof for receiving the inwardly turned end 27 of a pair of opposed brackets 28. Each bracket 28 has an inwardly turned portion which terminates in a downwardly extending portion. An iron bar 29 extends between the bottom ends of the brackets 28. The bar 29 is constructed of iron that is attracted to a magnet. The iron bar is, in turn, carried within a retaining bracket 30 that has an opening therein for allowing the bar to reciprocate in a vertical direction. The bottom end of the retaining bracket 30 turns inwardly as at 31 and engages a back plate 32. Positioned between the bracket 30 and the back plate 32 adjacent the top of the bracket 30 is a permanent horseshoe shaped magnet 33. A screw 34 is threaded through the bracket 30 into the back plate 32 for drawing the permanent magnet 32 tightly therebetween and holding such in position. Thus, when is is desired that the trap door be closed it is placed in the horizontal position, such as illustrated in FIG. 3, and maintained therein by the permanent magnet engaging the iron bar 29. In order to open the trap door the operator merely depresses such downwardly, causing the iron bar to break from the magnetic field of the horseshoe magnet 33 and the iron bar 29 moves downwardly within the bracket to the dotted line position shown in FIG. 4. The back plate 32 is attached to the vertical standard 19 by the same bolt 20, which attaches the brace 18 thereto. A spacer 34 is carried between the back plate 32 and the vertical standard 19. Preferably, it is best that the brace 30, the back plate 32, spacer 34 and the bracket 28, be constructed of non-magnetic material so that they will not be attracted to the magnet 33 and, therefore, interfere with the opening operation of the trap door C.

As the bottles 11 are moved along the conveyor the conveyor will not normally run in a true longitudinal line and, as a result, will shift laterally slightly on its drive mechanism. In order to accurately align the rows of bottles 11 with the particular trap door C associated therewith, divider plates D are carried between each of the rows for defining the path of the bottles 11. These divider plates D float over the conveyor A so as to compensate for the lateral movement thereof. The divider plates are constructed of relatively thin elongated metal sheets which have their leading end 35 supported on a wire 36 which is, in turn, supported on a horizontal bar 37 that spans across and above the conveyor A. The horizontal bar 37 is supported by any suitable vertical standards attached to the frame of the conveyor (not shown). In order to allow the divider plate D to shift laterally slightly the other end of the divider plate is attached to a vertical bar 38 by any suitable means, such as welding, which is, in turn, welded to a post 39. The post 39 is allowed to rotate within a sleeve 40 that is welded to the bottom side of a horizontal flange 41 of an angle member 42. The vertical flange 43 of the angle member 42 is attached by bolt 16 to the brace 18. Therefore, as the conveyor 10 shifts laterally slightly the leading end of the divider plate is allowed to shift with the row of bottles passing therethrough, while the trailing end of the divider plate which is welded to the bar 38 is allowed to pivot slightly. A pair of divider plates is used to align a row of bottles with the particular trap door C associated therewith.

A striker gate F is carried on the top of each of the vertical bars 38 by means of a sleeve 44 extending over the bar 38. An abutment 45 is welded to the vertical bar for holding the sleeve adjacent the top of the vertical bar 38. The upper end of the abutment 45 is tapered to a point as at 46 for engaging a corresponding V-shaped cutout 47 in the sleeve for locking the sleeve 44 in position on the bar 38. The sleeve 44 has a pair of the V-shaped slots 47 cut therein spaced at 90 degrees relative to each other so that the gate F can be locked in the open position, such as illustrated in FIG. 4, or in the closed position such as illustrated by the left-hand gate in FIG. 3. The gate F includes a flat vertical metal member which is attached to the sleeve 44 by any suitable means, such as welding. Adjacent the outer lower edge of the gate 48 is an inwardly turned right-angle shaped portion 49 which abuts against the adjacent vertical bar 38 when the gate is in a closed position, such as illustrated on the left-hand side in FIG. 2. It is noted that the lower left-hand portion of the vertical gate is removed so that the angle member 49 can abut against the vertical bar 38. This enables the gate F to be perpendicular to the axis of travel of the bottles on the conveyor. It is desired that the striker gate F present a vertical surface for the upper end of the bottle to engage when it is being dropped through the trap door C. If the surface were not perpendicular, to the axis of travel of the bottles, the bottles would tend to slide off to the side.

Referring in detail to FIG. 1, it can be seen starting with the top row and counting downwardly, rows 1 3, 4 and 8 have the gates in an open position and the trap doors closed. The bottles in these rows are then shifted over the trap doors onto an endliner conveyor E. In rows 2, 3, 6 and 7 the trap doors are open with the striker gate F closed. The bottles are shown in the tilted position as they drop through the trap door into a receptacle.

In operation, for example, if it is desired to strip the bottles in row 1 the operator would depress the trap door C, lift the striker gate F associated therewith, and pivot such so that it is closed. The bottles traveling in row 1 would then pass over the vibrating plate and tilt. As they tilt the top of the bottle engages the striker plate F and the vibrator plate B walks the bottom of the bottle off through the opening provided by the trap door C.

While a preferred embodiment of the invention has been described using specific terms, such description is for illustrative purposes only and it is to be understood that changes and variations may be made without departing from the spirit or scope of the following claims.

I claim:

1. An apparatus for extracting articles from a plurality of rows of articles carried on a moving conveyor comprising: a plurality of pairs of elongated divider plates carried over said conveyor for maintaining said articles in rows on said moving conveyor, means for supporting said divider plates to shift laterally with each row of articles on said conveyor as said rows of articles are moved along said conveyor, trap doors carried adjacent an end of said conveyor between each pair of elongated divider plates in the path of each row of articles, a receiving station positioned on an opposite side of said trap doors from said conveyor, an elongated vibrating plate carried adjacent an end of said conveyor between said conveyor and said trap doors for receiving said rows of articles from said conveyors and transferring said articles to said trap doors, and means for opening said trap doors for allowing said articles moving across said vibrating plate to drop through said trap doors for removing predetermined articles from said rows of articles, whereby when said trap doors are closed said articles are pushed over said trap door to said receiving station by succeeding articles moving across said vibrating plate.

2. The apparatus as set forth in claim 1, wherein gates are carried between said trap doors and said receiving station, and means for closing said gates for preventing said articles from being transferred to said receiving station and for aiding in directing said articles through said trap doors when said trap doors are open.

* * * * *